United States Patent [19]

Sakakibara et al.

[11] Patent Number: 4,650,444
[45] Date of Patent: Mar. 17, 1987

[54] ENDLESS TRANSMISSION BELT

[75] Inventors: Shiro Sakakibara, Toyokawa; Sadahiro Koshiba, Anjo, both of Japan

[73] Assignee: Aisin Warner Limited, Japan

[21] Appl. No.: 779,249

[22] Filed: Sep. 23, 1985

[30] Foreign Application Priority Data

Sep. 26, 1984 [JP] Japan .................. 59-201167

[51] Int. Cl.$^4$ .............................................. F16G 5/18
[52] U.S. Cl. ...................................... 474/201; 474/242
[58] Field of Search ............... 474/201, 240, 242, 244, 474/245, 248, 265

[56] References Cited

U.S. PATENT DOCUMENTS

| 801,451 | 10/1905 | Fouillaron | 474/201 |
|---|---|---|---|
| 4,313,730 | 9/1982 | Cole, Jr. et al. | 474/201 |
| 4,338,081 | 7/1982 | Hattori et al. | 474/201 |
| 4,427,401 | 1/1984 | Hendriks et al. | 474/201 |
| 4,449,960 | 5/1984 | van der Lely | 474/242 |
| 4,486,185 | 12/1984 | Cataldo | 474/201 |
| 4,516,964 | 5/1985 | Laster | 474/201 X |
| 4,516,965 | 5/1985 | Mott | 474/245 |
| 4,525,160 | 6/1985 | Okawa et al. | 474/242 |
| 4,545,779 | 10/1985 | Sakakibara et al. | 474/242 X |

FOREIGN PATENT DOCUMENTS

| 0073692 | 3/1983 | European Pat. Off. | 474/242 |
|---|---|---|---|
| 0121350 | 4/1948 | Sweden | 474/242 |

Primary Examiner—Stephen J. Novosad
Assistant Examiner—Thuy M. Bui
Attorney, Agent, or Firm—Steele, Gould & Fried

[57] ABSTRACT

An endless transmission belt adapted for extension between a pair of pulleys for a V-belt type continuously variable transmission, the belt comprising: a plurality of linking units, each link unit comprising a plurality of link elements having opposite end portions thereof over lapped alternately with link elements of adjacent link units; joint members pivotally connecting the overlapped end portions of adjacent links; paired first and second blocks disposed over each of the link units between adjacent joint members, each block having side surfaces engageable with the pulleys; each of the first blocks having an outer lapping face in abutting engagement with an adjacent second block and having an inter lapping face with a connecting portion in engagement with one of the joint members, each of the joint members pivotally supporting one of the first blocks in a radial position providing a clearance between each first block and each link unit; and, each of the second blocks having an outer lapping face in abutting engagement with an adjacent first block and an inter lapping face with a connecting portion in engagement with one of the joint members, each of the joint member pivotally supporting one of the second blocks in a radial position providing a clearance between each second block and each link unit.

2 Claims, 14 Drawing Figures

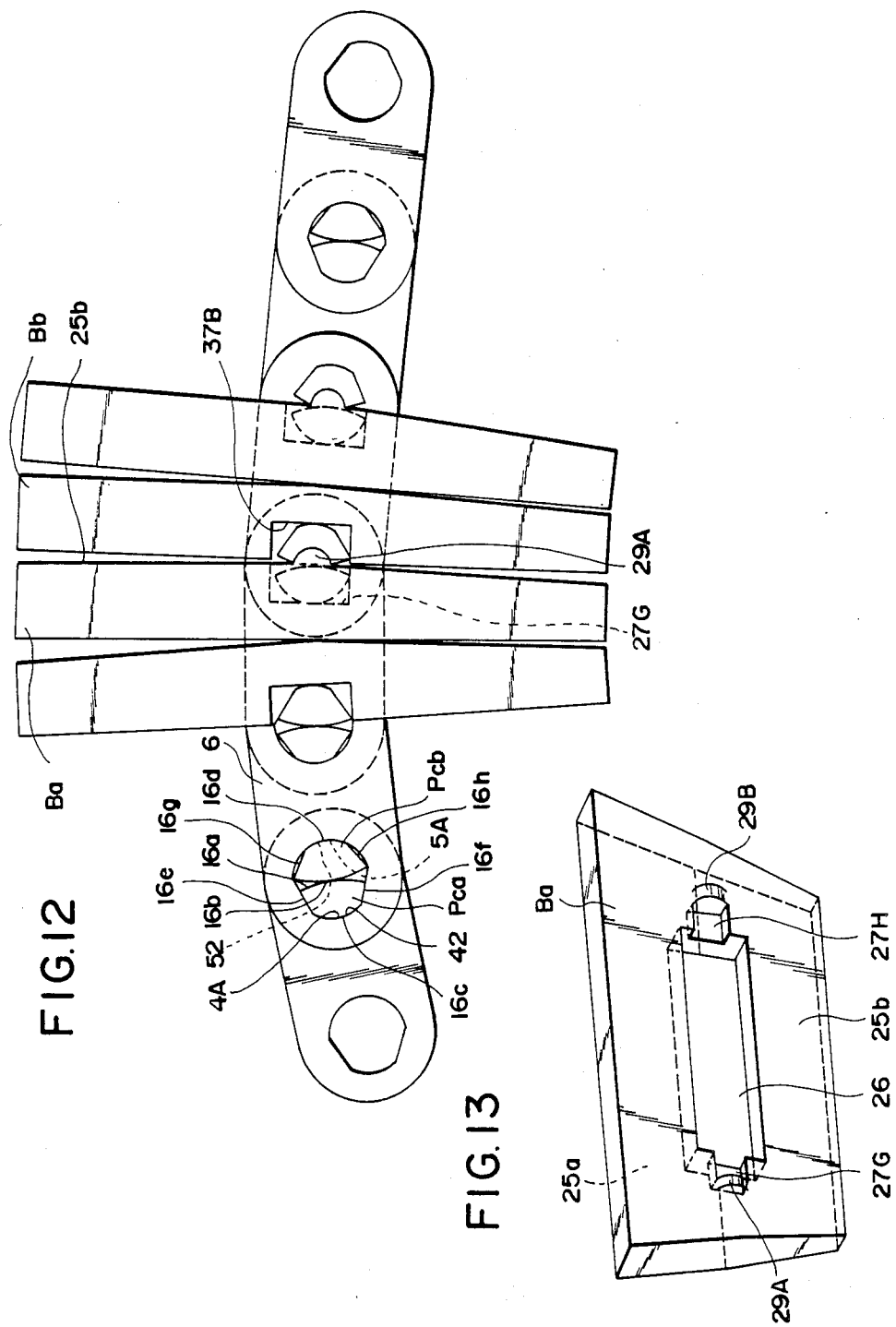

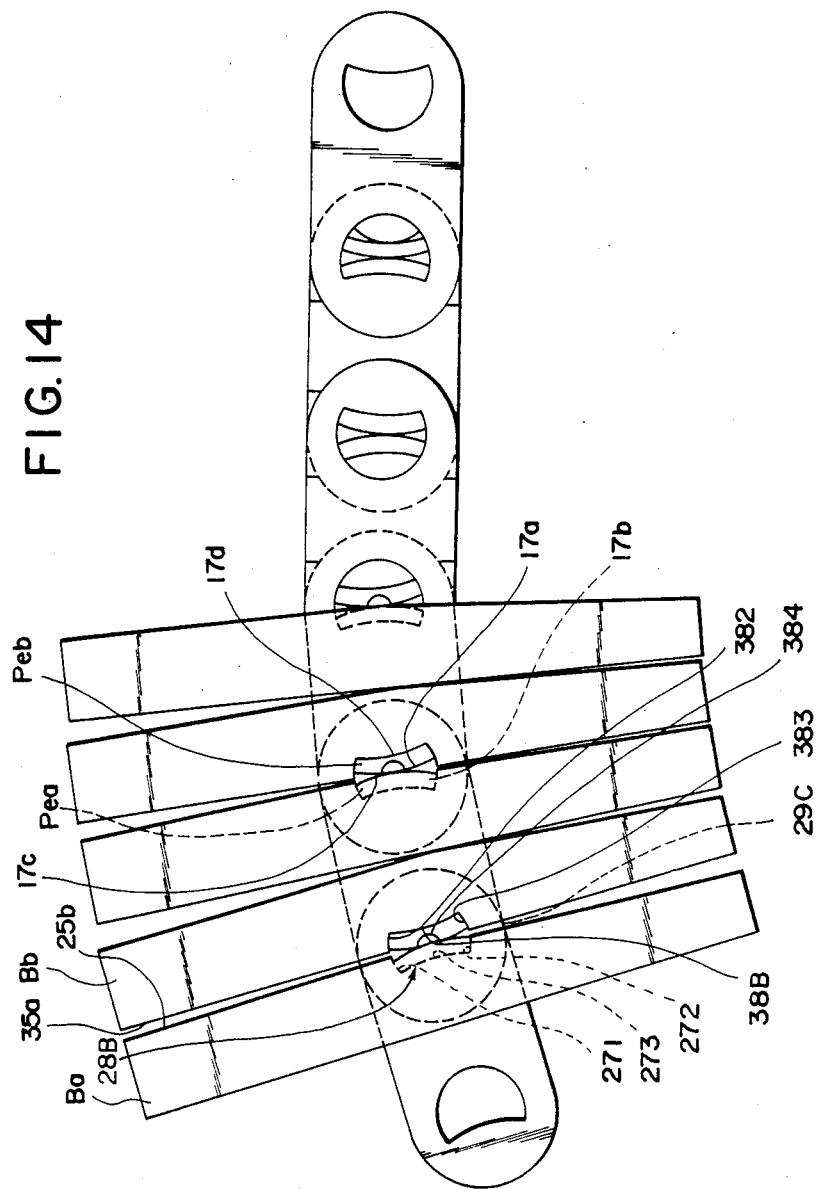

ENDLESS TRANSMISSION BELT

BACKGROUND OF THE INVENTION (i) Field of the Invention

This invention relates to an endless transmission belt suitable for use in V-belt type stepless or continuous transmissions.

(ii) Description of the Prior Art

In our prior application, Japanese laid-Open Patent Application No. 58-21043 corresponding to U.S. Pat. No. 4,545,779) proposes an endless drive belt for transmitting torque between a couple of pulleys of the type having a pair of conical contact surfaces opposingly disposed in coaxial relation with each other. The endless belt comprises a multitude of chained trapezoidal metal blocks each having inclined contact surfaces formed on part or entire areas of lateral side surfaces for engagement with the contact surfaces of the pulleys. More particularly, the endless drive belt of our prior application employs metal blocks each comprising a plate of trapezoidal shape in front view, having the inclined contact surfaces formed on part or entire areas of its lateral side surfaces and having, bored through its thickness, one or two apertures with predetermined dimensions in widthwise direction or one or two notches opened on the outer pheripheral edges thereof, and an endless link chain comprising a multitude of link units of uniform lengths connected with each other at the opposite ends thereof. The link chain has a width which can be fitted in the above-mentioned aperture or notch, the links being longitudinally inserted in the apertures or notches of the metal blocks crosswise. The metal blocks are each connected to the link chain by at least one shaft and are successively mounted along the length of the link chain, transferring the transmitted force from a preceding metal block to a succeeding metal block through the link chain. In this case, the blocks are retained in position by pins (connecting means) in order not to subject the links to unnecessary forces other than the transmitting torque.

However, as each metal block is located between adjacent pins in the endless transmission belt of the above-described arrangement, there is a possibility of impairing durability of the blocks which have to bear relatively large loads.

SUMMARY OF THE INVENTION

It is an object of the present invention to provide an endless transmission belt in which, in order to overcome the above-mentioned problem, a pair of metal blocks are located between adjacent joint means which hold the blocks in position, receiving loads by the paired blocks between the adjacent joint means to enhance durability of the blocks.

According to the present invention, there is provided an endless transmission belt, comprising: a plural number of link units each comprising a series of link elements having opposite end portions overlapped alternately with end portions of link elements of adjacent link units; joint means pivotally connecting the overlapped end portions of adjacent link units; and paired first and second blocks fitted successively on the link units and retained in position between adjacent joint means by engagement therewith; the first block having an outer lapping face in abutting engagement with an outer lapping face of an adjacent second block and an inner lapping face having a connecting portion in engagement with a joint means; and the second block having an outer lapping face in engagement with an outer lapping face of a adjacent first block and an inner lapping face having a connecting portion in engagement with the joint means.

The endless transmission belt with the above-described arrangement according to the invention has a number of advantages as follows.

(a) A couple of blocks are located between adjacent joint means which hold the blocks in position on the links, to receive the load by the two blocks between two adjacent joint means. It follows that the blocks are contacted with the pulleys of a V-belt type stepless transmission through increased number of contact surfaces and therefor improved in durability to a significant degree.

(b) The machining process is facilitated since it suffices to form a joint groove on only one face of each of the paired blocks which engage the joint means.

(c) The blocks comprise plates of a small thickness and are therefore easy to machine.

(d) Since the first and second blocks are engaged with the joint means pivotally in a predetermined range, the paired blocks between the joint means are successively brought into contact with the pulleys in a posture lying in the direction of the center of rotation of the pulleys when the endless transmission belt is passed around the pulleys. Therefore, as compared with the endless transmission belt having only one block between the adjacent joint means, it is possible to reduce the variations in speed which occur when an endless transmission belt takes a polygonal shape on a pulley.

The above and other objects, features and advantages of the invention will become apparent from the following description and the appended claims, taken in conjunction with the accompanying drawings which show by way of example some preferred embodiments of the invention.

BRIEF DESCRIPTION OF THE DRAWINGS

In the accompanying drawings

FIG. 12 is a side view of a ninth embodiment of the invention;

FIG. 13 is a perspective view of the first block in the endless transmission belt of FIG. 12; and FIG. 14 is a side view of a tenth embodiment of the invention.

DETAILED DESCRIPTION OF THE PREFERRED EMBODIMENTS

Figure 1:
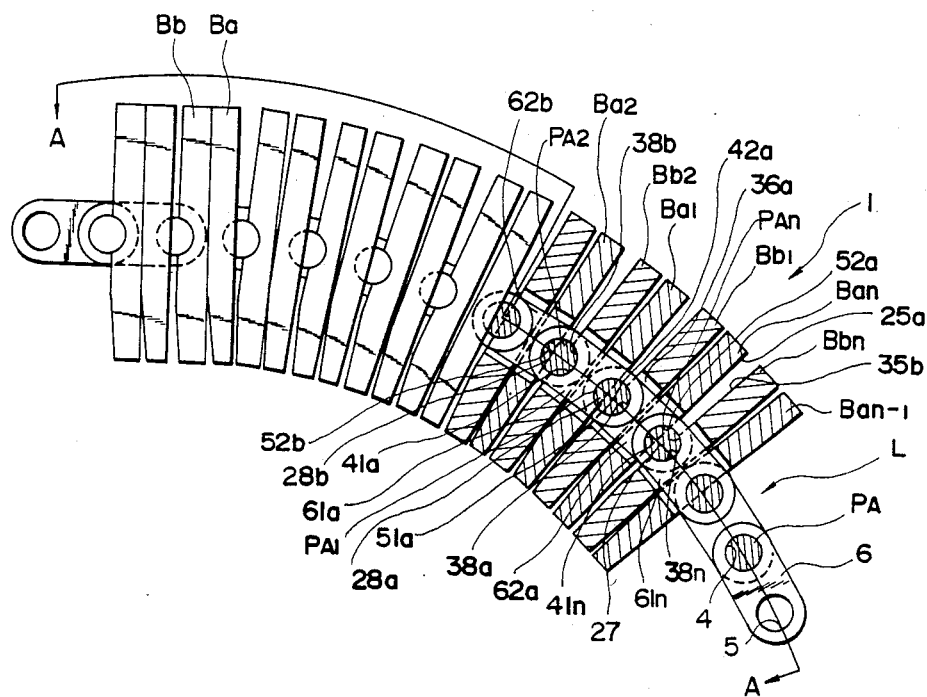
FIG. 1 illustrates a first embodiment of the endless transmission belt of the invention in a partly sectioned side view.

Hereafter, the endless transmission belt of the invention is described more particularly by way of preferred embodiments shown in the drawings.

Referring to FIGS. 1 to 4, there is illustrated a first embodiment of the endless transmission belt of the invention, wherein the belt 1 comprises a series of links units L each comprising a number of longitudinally extending link elements 6 having end portions thereof overlapped alternately with end portions of link elements 6 of adjacent link units L, cylindrical pins PA serving as joint means for pivotally connecting adjacent link units L, a first block Ba retained on one side of each cylindrical pin PA, and a second block Bb retained on the other side of the cylindrical pin PA.

The first block Ba of a metal, synthetic resin or ceramic material is formed in a trapezoidal shape having its width reduced from its top edge 22 toward its bottom edge 23 to provide inclined contact surfaces 24 on the opposite lateral sides 21a and 21b for engagement with the conical contact surfaces of pulleys of a V-belt type stepless or continuous transmission, and has a suitable thickness for forming inner and outer lapping faces 25b and 25a to be contacted with opposing inner and outer lapping faces 35a and 35b of the adjacent second blocks Bb. The lapping face 25b of each block Ba is provided with a tapered surface 251 which converges toward the center to permit flexing movements of the endless transmission belt 1. An opening 26 of a rectangular shape is formed from one lapping face 25a to the other lapping face 25b to receive a link L therein. The other lapping face 25b of the block Ba is centrally provided with banks 27a and 27b, and a pin holder groove 28, a first connecting means, is formed across the opening 26 in the longitudinal direction thereof.

The second block Bb of a metal, synthetic resin or ceramic material is likewise formed in a trapezoidal shape having its width reduced from its top edge 32 toward its bottom edge 33 to provide inclined contact surfaces 34 on the opposite lateral side surfaces 31a and 31b for engagement with the conical contact surfaces of the pulleys of the V-type stepless transmission, and has a suitable thickness for forming inner and outer lapping faces 35b and 35a to be contacted with the inner and outer lapping faces 25a and 25b of adjacent first blocks Ba. One lapping face 35a of each second block Bb is provided with a tapered surface 351 which is converged toward the center to permit flexing movements of the endless transmission belt 1. Similarly, an opening 36 of a rectangular shape is bored from one lapping face 35a to the other lapping face 35b to receive a link therein. A pin insertion groove 38, serving as a second connecting means, is formed centrally on the other lapping face 35b of the block Bb longitudinally across the opening 36.

The links L each comprises a number of link elements 6 of thin metal strips which are juxtaposed in the transverse direction and provided with pin receiving holes 4 and 5 in the opposite end portions. The end portions of the adjacent links are overlapped alternately such that the pin receiving holes 4 and 5 are aligned with each other, and pivotally connected to each other by a cylindrical pin PA which has its circumference formed in a round shape at least in a major portion to be fitted in the pin receiving holes 4 and 5. The link elements 6 have a height slightly smaller than the width of the openings 26 and 36 in the first and second blocks Ba and Bb, that is to say, slightly smaller than the width of the spaces between the upper and lower edges 22 and 23 of the opening 26 and between the upper and lower edges 32 and 33 of the opening 36. The distance between the pin receiving holes 4 and 5 in the opposite end portions of the link elements 6 is determined such that, when the cylindrical pins Pa are fitted in the holes 4 and 5, they are engaged with the joint grooves 28 and 38 to hold the first and second blocks Ba and Bb in position without dislocations.

The cylindrical pin PA has a length and an outer shape corresponding to the pin holder groove 28 extending longitudinally across the opening 26 of the block Ba.

Figure 2:
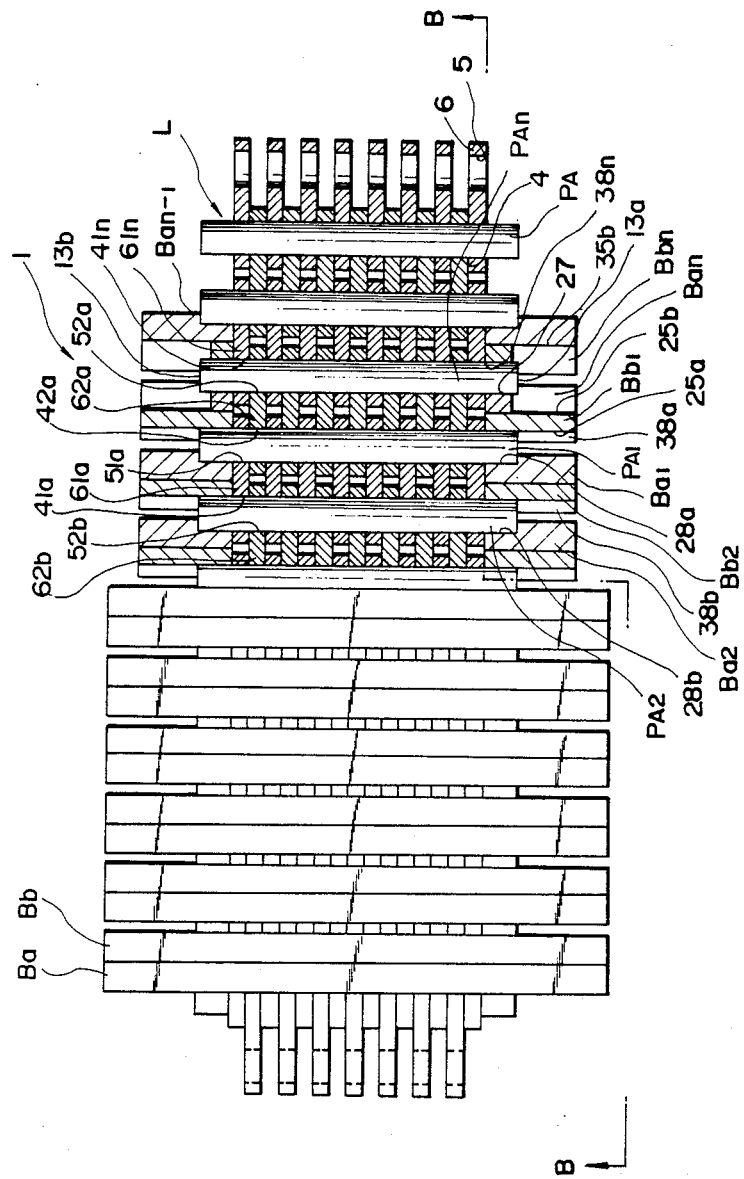
FIG. 2 is a sectional view taken on line A—A of FIG. 1.
Figure 3:
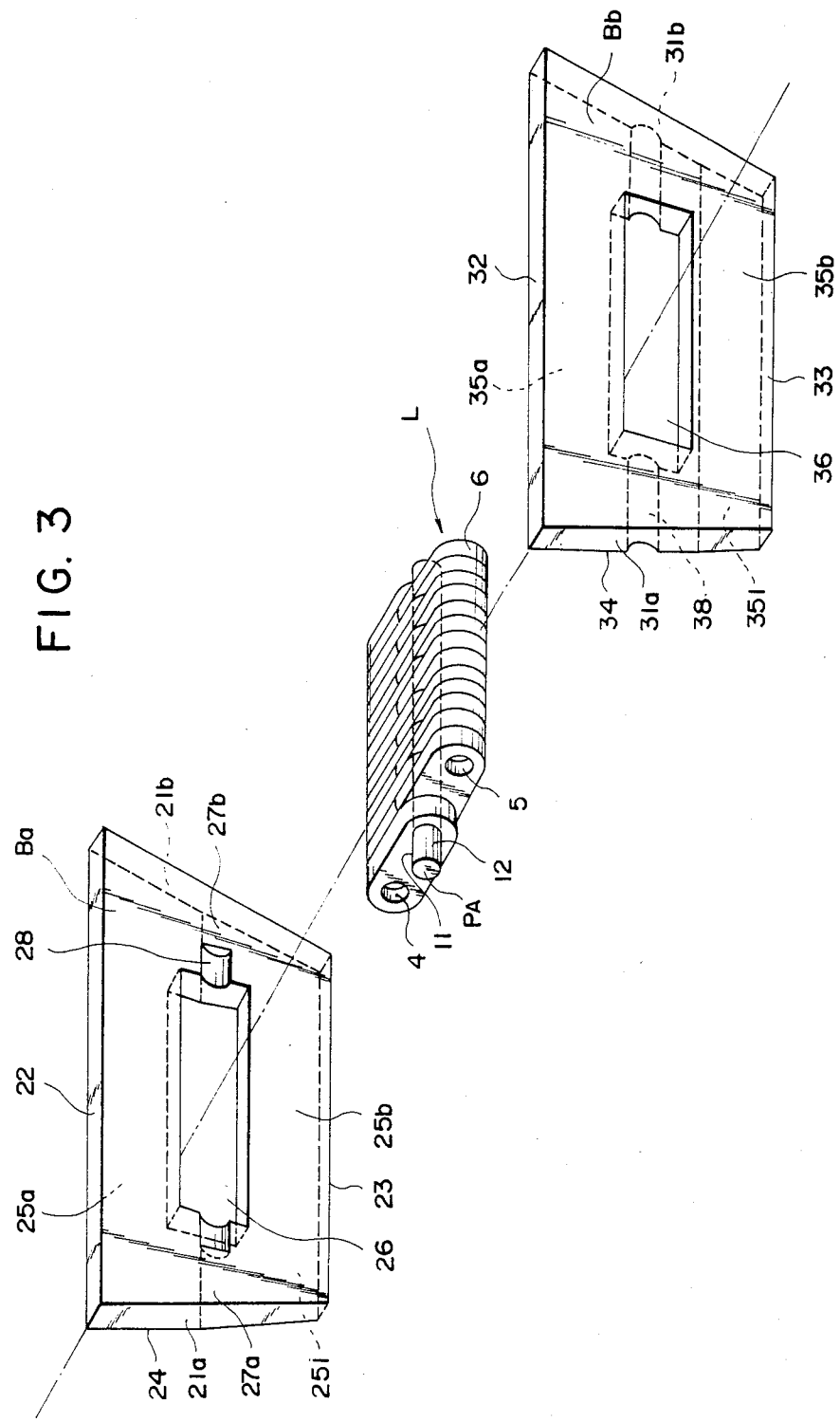
FIG. 3 is an exploded view of major components of the endless transmission belt according to the invention.

The endless transmission belt 1 of the invention, having the paired first and second blocks Ba and Bb successively retained in position by the links L and cylindrical pins PA, is assembled in the manner as described below with reference to FIGS. 1 and 2.

(a) The link elements 61a in the left-hand rows (in FIG. 2) of the first joint are fitted into the opening 36a of the block Bb1 in the first position from the side of the lapping face 35b, and then the holes 42a in on end portions of the link elements 62a in the right-hand rows are aligned with the pin insertion groove 38a of the block Bb1 in the first position. Next, the holes 51a in the other end portions of the link elements 61a in the left-hand rows of the first joint are aligned with the holes 42a in one end portions of the link elements 62a in the right-hand rows of the first joint, and pivotally connected with each other by insertion of a first cylindrical pin PA1. The block Ba1 in the first position is fitted on the link elements 61a in the left-hand rows of the first joint from the side of the pin holder groove 28a.

(b) The block Bb2 of the second position is fitted on the link elements 61a in the left-hand rows of the first joint from the same direction as the block Bb1 in the first position. In the next place, the connecting holes 41a in one end portions of the link elements 61a in the left-hand rows of the first joint are aligned with the joint holes 38b of the block Bb2 in the second position, and joint holes 38a in one end portions of the link elements 61a in the left-hand rows of the first joint are aligned with and pivotally connected to joint holes 52b in the other end portions of the link elements 62b in the right-hand rows of the second joint by means of a second cylindrical pin PA2. Then, the block Ba2 in the second position is fitted on the link elements 62b in the right-hand rows of the second joint from the side of the pin holder groove 28b.

The foregoing procedures are repeated before assembling the terminal links and blocks as follows.

Figure 4:
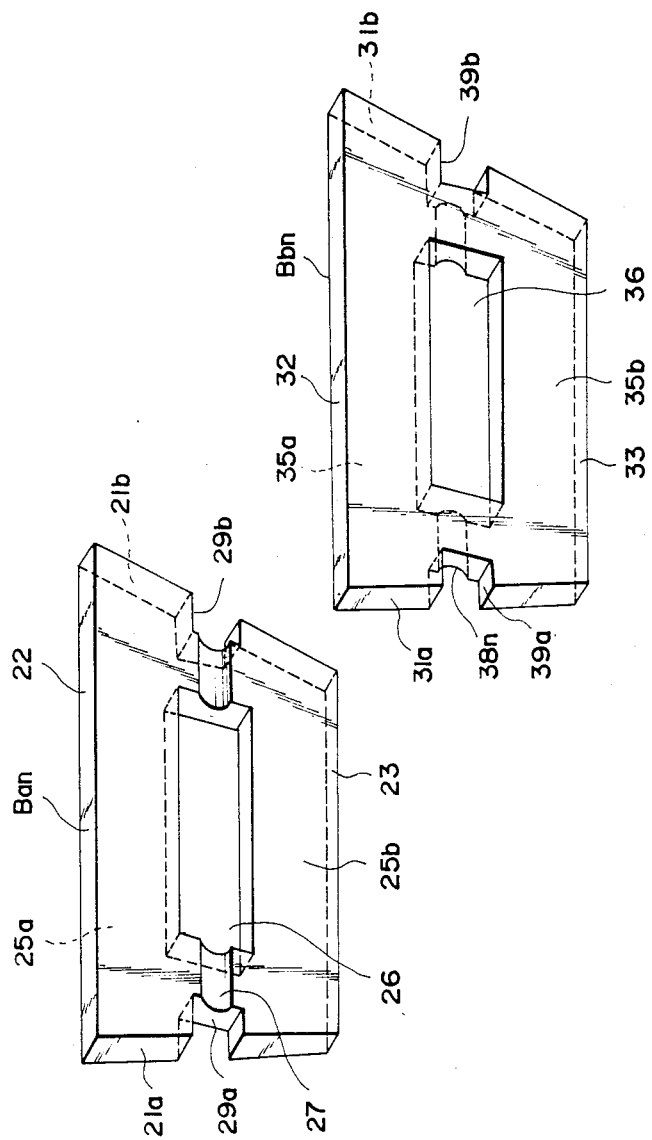
FIG. 4 is a perspective view of terminal blocks on the endless transmission belt.

(1) After fitting the block Ban-1 in the n-1 position on the link elements 61n in the left-hand rows of the final joint, the block Ban of the final position is fitted on the link elements 62a in the right-hand rows of the first joint from the side of the lapping face 25a as shown also in FIG. 4, and the block Bbn of the final pair is fitted on the link elements 6an in the left-hand rows of the final joint from the side of the lapping face 35b. The joint holes 41n in one end portions of the link elements 6an in the left-hand rows of the final joint are aligned with pivot holes 52a in the other end portions of the link elements 62a in the left-hand rows of the first joint, the pin insertion hole 27 of the terminal first block Ban and the pin insertion hole 27 of the terminal first block Ban and the pin insertion hole 38 of the final second block Bbn, and pivotally connected to the link elements 62a of the first joint by a terminal cylindrical pin PAn. The terminal first and second blocks Ban and Bbn are provided with notches 29a, 29b, 39a and 39b on the opposite lateral sides 21a, 21b, 31a and 31b, respectively, to caulk the end portions 13a and 13b of the terminal cylindrical pin PAn or to fit snap rings on the end portions 13a and 13b or to mount pin stopper covers on the end portions 13a and 13b to prevent fall-off the terminal pin PAn.

Figure 5:
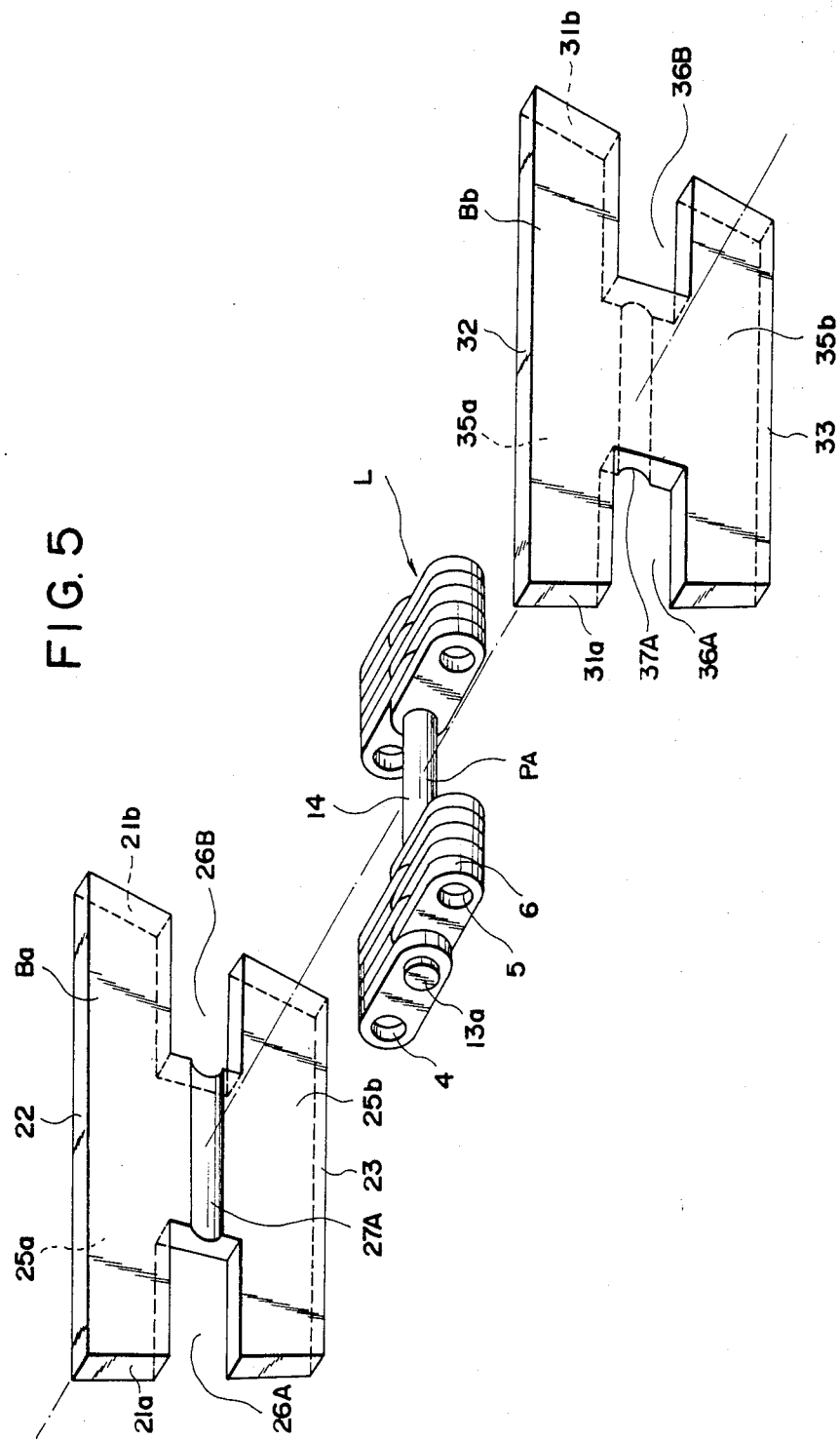
FIG. 5 is an exploded view of a second embodiment of the invention; .

Illustrated in FIG. 5 is a second embodiment of the endless transmission belt of the invention, in which the component parts common to the foregoing first embodiment in function are designated by like reference numerals.

More particularly, the second embodiment of FIG. 5 employs first and second blocks Ba and Bb which are provided with link insertion notches 26A, 26B, 36A and 36B open on the opposite lateral side walls 21a, 21b, 31a and 31b, respectively. The lapping face 25b of the first block Ba is centrally formed with a groove 27A which constitutes the first connecting means to be stopped by a cylindrical pin PA. The lapping face 35a of the second block Bb is centrally formed with a groove 37A which constitutes the first connecting means to be stopped by a cylindrical pin PA. On the other hand, the links L have the link elements fitted on the opposite end portions of a cylindrical pin PA which oppose the link insertion recesses 26A and 26B, and the opposite end portions of the cylindrical pin PA which has its center portions 13 fitted in the grooves 27A and 37A are caulked to prevent drop-off of the pin PA.

Figure 6:
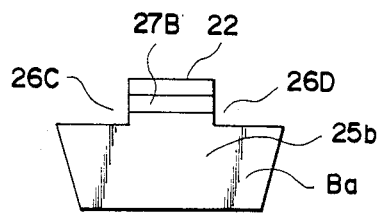
FIG. 6 is a front view of blocks of a third embodiment of the invention.

Illustrated in FIG. 6 is a third embodiment of the endless transmission belt of the invention, in which the first block Ba has the opposite corner portions of its upper edge 22 cut off the provide link insertion notches 26C and 26C, and a groove 27B is formed in a center portion of the lapping face 25b at a position closer to the top edge 22.

Figure 7:
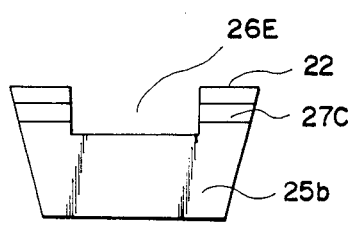
FIG. 7 is a front view of blocks of a fourth embodiment of the invention.

Illustrated in FIG. 7 is a fourth embodiment of the endless transmission belt of the invention, in which the first block Ba has a center portion of its top edge 22 cut off to provide a link insertion notch 26E, and a groove 27C is formed on the opposite sides of the link insertion notch 26E on the lapping face 25b.

Figure 8:
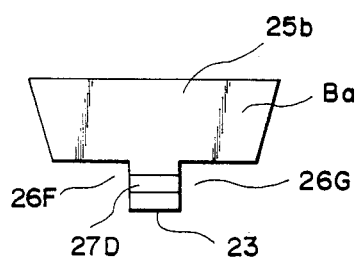
FIG. 8 is a front view of blocks of a fifth embodiment of the invention.

Illustrated in FIG. 8 is a fifth embodiment of the endless transmission belt of the invention, in which the first block Ba has the opposite corner portions of its bottom edge 23 cut off to provide link insertion notches 26F and 26G, and a groove 27D is formed centrally on the lapping face 25b at a position closer to the bottom edge 23.

Figure 9:
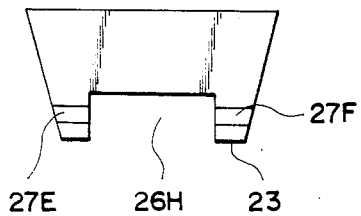
FIG. 9 is a front view of a sixth embodiment of the invention.

Illustrated in FIG. 9 is a sixth embodiment of the endless transmission belt of the invention, in which the first block Ba has a center portion of its bottom edge 23 cut off to provide a link insertion notch 26H, and grooves 27E and 27F are formed on the opposite sides of the link insertion notch 26H on the lapping face 25b.

Figure 10:
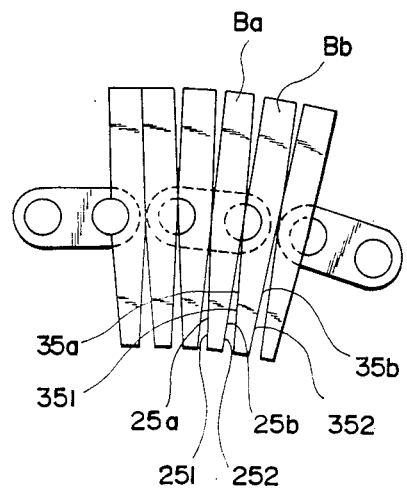
FIG. 10 is a side view of a seventh embodiment of the invention.

Illustrated in FIG. 10 is a seventh embodiment of the endless transmission belt of the invention, in which the first and second blocks Ba and Bb are provided with tapered surfaces 251, 252, 351 and 352 on the lapping faces 25a, 25b, 35a and 35b, respectively, to permit flexing movements of the belt.

Figure 11:
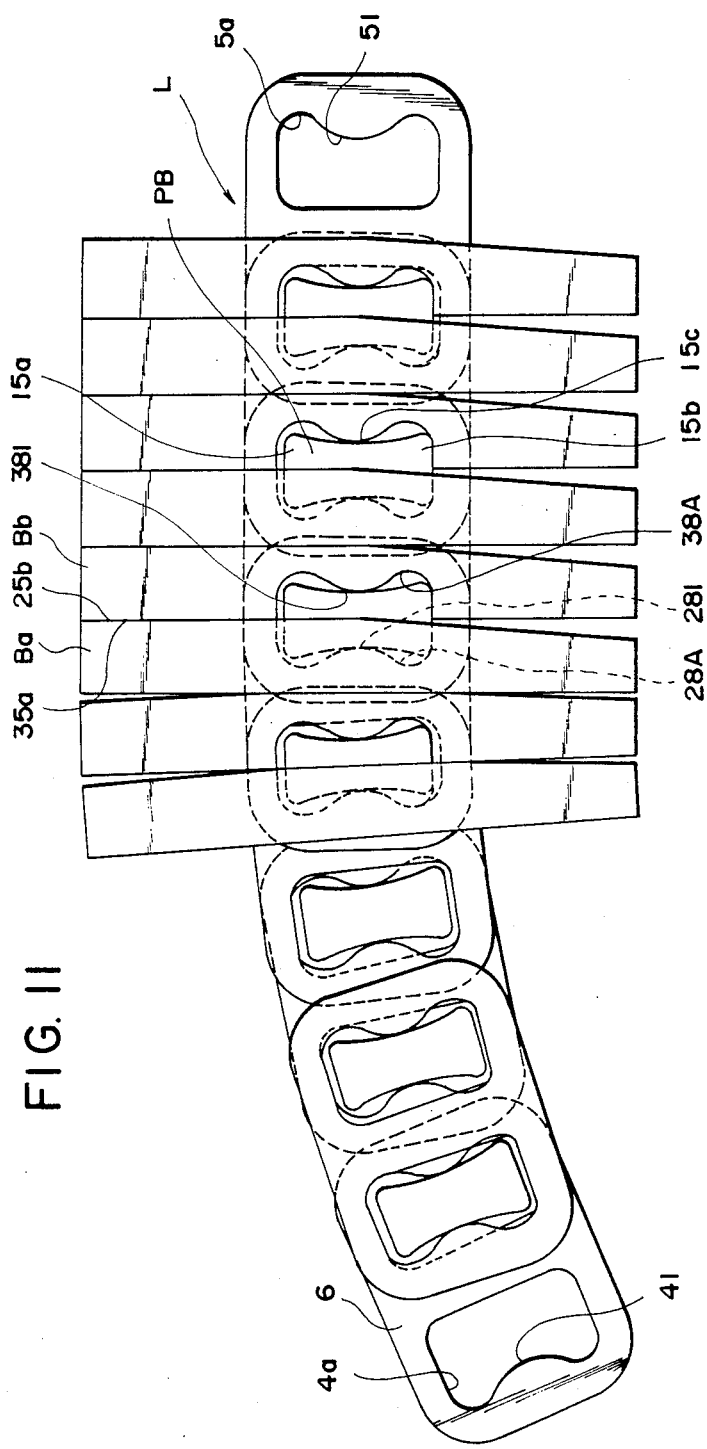
FIG. 11 is a side view of an eighth embodiment of the invention.

Illustrated in FIG. 11 is an eighth embodiment of the endless transmission belt of the invention, wherein the first block Ba is provided with a curved projection at each end of the pin holder groove 28A which is formed centrally on the lapping face 25b of the block as a connecting groove, and the second block Bb is similarly provided with a curved projection 381 at each end of the pin insertion groove 38A which is formed centrally on the lapping face 25a. Rod-like pins PB which serve as connecting means each has its diameter reduced arcuately toward a center portion 15c from the opposite end portions 15a and 15b, with the center portion 15c abutted on the afore-mentioned projections 281 and 38 to hold the first and second blocks Ba and Bb in position. The link elements 6 of each link L are provided with projections 41 and 51, with curved configurations corresponding to the projections 281 and 381, on the inner walls 4a and 5a of the pivot holes 41 and 5A, the projections 41 and 51 being held in rolling contact with the center portion 15c of the rod-like pin PB to permit articular movements of the belt.

Illustrated in FIGS. 12 and 13 is a ninth embodiment of the endless transmission belt of the invention, in which rolling contact pins PCa and PCb are provided with abutting curved surfaces 16a and 16b along with curved surfaces 16c and 16d of the same curvature as curved wall surfaces 42 and 52 in the articulate holes 4 and 5 of the link elements 6, the curved surfaces 16a to 16d being connected by flat surfaces 16e to 16h. The first block Ba is provided with rectangular pin holder grooves 27G and 27H on the lapping face 25b at the opposite ends of a link inserting opening 26 to serve as connecting means, and semi-circular projections 29A and 29B are formed at the outer ends of the pin holder grooves 27G and 27G to prevent fall-off of the joint pin.

In this embodiment, the curved surfaces of the rolling contact pins Pca and Pcb are formed over the ranges in which the pins are contacted with the rectangular pin holder grooves 27G and 27H of the first block Ba and the rectangular pin insertion groove 37B of the second block Bb. The flat surfaces 16e to 16h are provided to prevent rotational sliding movements of the rolling contact pins Pca and Pcd relative to the link elements 6.

Illustrated in FIG. 14 is a tenth embodiment of the endless transmission belt of the invention, in which the first block Ba is provided with a pin holder groove 28b on the lapping face 25b as the second connecting means, the pin holder groove 28b having concentric upper and lower curved walls 271 and 272 and an arcuate bottom wall 273 connecting the upper and lower curved walls 271 and 272, and a semi-circular formed at each end of the pin holder groove 28B to prevent drop-off of the pin. The second block Bb is provided with a pin insertion groove 38B on its inner lapping face 35a as the first connecting means, the pin groove 38B having concentric upper and lower curved walls 382 and 383 and an arcuate bottom surface 384 connecting the upper and lower curved surfaces 382 and 383. The rolling contact pins Pea and Peb, which serves as a joint means, consists of an arcuate plate member 17b with a curved abutting face 17a protruding toward the joint point from the inner lapping face 25b of the first block Ba, and an arcuate plate member 17d with a curved abutting face 17c protruding toward the joint point from the inner lapping face 35a of the second block Bb. In this case, adjacent links are joined by a pair of rolling contact pins Pea and Peb instead of a single joint pin. The use of the rolling contact pins Pea and Peb which are rotatable by rolling can contribute to improvement of durability of the links L by reduction of friction.

What is claimed is:

1. An endless transmission belt, adapted for extension between a pair of pulleys for a V-belt type continuously variable transmission the belt comprising:

a plurality of link units, each link unit comprising a plurality of link elements having opposite end portions thereof overlapped alternately with end portions and link elements of adjacent link units;

joint means pivotally connecting the overlapped end portions of adjacent links;

paired first and second blocks disposed over each of the link units between adjacent joint means, each block having side surfaces engageable with the pulleys;

each of said first blocks having an outer lapping face in abutting engagement without an adjacent second block and having and inner lapping face with a connecting portion in engagement with one of said joint means, each of said joint means pivotally supporting one of the first blocks in a radial position providing a clearance between each first block and each link unit; and, each of said second blocks having an outer lapping face in abutting engagement with an adjacent first block and an inner lapping face with a connecting portion in engagement with one of said joint means, each of said joint means pivotally supporting one of the second blocks in a radial position providing a clearance between each second block and each link unit.

2. The enless transmission belt of claim 1, wherein each one of said lapping faces of said first end second blocks is provided with an inwardly converging tapered surface to permit flexing movements of the belt.

* * * * *